United States Patent
Bokisa et al.

(10) Patent No.: US 11,913,131 B2
(45) Date of Patent: Feb. 27, 2024

(54) TERNARY ZINC-NICKEL-IRON ALLOYS AND ALKALINE ELECTROLYTES OR PLATING SUCH ALLOYS

(71) Applicant: Coventya, Inc., Brooklyn Heights, OH (US)

(72) Inventors: George Bokisa, North Olmsted, OH (US); Tony Oriti, Brooklyn Heights, OH (US); Markus Jahn, Brooklyn Heights, OH (US)

(73) Assignee: MacDermid, Incorporated, Waterbury, CT (US)

( * ) Notice: Subject to any disclaimer, the term of this patent is extended or adjusted under 35 U.S.C. 154(b) by 0 days.

(21) Appl. No.: 16/302,454

(22) PCT Filed: May 24, 2017

(86) PCT No.: PCT/US2017/034186
§ 371 (c)(1),
(2) Date: Nov. 16, 2018

(87) PCT Pub. No.: WO2017/205473
PCT Pub. Date: Nov. 30, 2017

(65) Prior Publication Data
US 2020/0071843 A1 Mar. 5, 2020

Related U.S. Application Data

(60) Provisional application No. 62/340,759, filed on May 24, 2016.

(51) Int. Cl.
*C25D 3/56* (2006.01)
*B32B 15/01* (2006.01)
(Continued)

(52) U.S. Cl.
CPC ............ *C25D 3/565* (2013.01); *B32B 15/017* (2013.01); *C22C 18/00* (2013.01); *C23C 22/53* (2013.01);
(Continued)

(58) Field of Classification Search
CPC .................. C25D 3/562; C25D 3/565
(Continued)

(56) References Cited

U.S. PATENT DOCUMENTS 4,717,458 A * 1/1988 Martin .................. C25D 3/565
205/245
4,772,362 A * 9/1988 Martin .................. C25D 3/565
205/255
(Continued)

FOREIGN PATENT DOCUMENTS

DE          3227755 A1     4/1984
JP          08-209379 A     8/1996
(Continued)

OTHER PUBLICATIONS

Abou-Krisha et al. "Electrodeposition and characterization of zinc-nickel-iron alloy from sulfate bath: influence of plating bath temperature". Journal of Solid Sate Electrochemistry. Jul. 22, 2008. pp. 879-885.
(Continued)

*Primary Examiner* — Edna Wong
(74) *Attorney, Agent, or Firm* — Carmody Torrance Sandak & Hennessey LLP

(57) ABSTRACT

A ternary zinc-nickel-iron alloy and aqueous alkaline electrolyte for electroplating the alloy includes zinc, nickel, and a complex of an iron salt.

13 Claims, 3 Drawing Sheets

A

B

(51) Int. Cl.
*C22C 18/00* (2006.01)
*C23C 22/53* (2006.01)
*C25D 5/48* (2006.01)
*H01R 13/03* (2006.01)

(52) U.S. Cl.
CPC ............... *C25D 5/48* (2013.01); *H01R 13/03* (2013.01); *C23C 2222/10* (2013.01)

(58) Field of Classification Search
USPC .......................................................... 205/246
See application file for complete search history.

(56) References Cited

U.S. PATENT DOCUMENTS

| | | | |
|---|---|---|---|
| 4,861,290 A | | 8/1989 | Halmstad et al. |
| 4,983,263 A | * | 1/1991 | Yasuda ................... C25D 3/565 |
| | | | 205/245 |
| 5,435,898 A | | 7/1995 | Commander et al. |
| 5,683,568 A | * | 11/1997 | Harris ..................... C25D 3/562 |
| | | | 106/1.27 |
| 6,468,411 B1 | | 10/2002 | Eckles et al. |
| 6,652,728 B1 | * | 11/2003 | Sonntag ................. C25D 3/565 |
| | | | 205/310 |
| 8,377,263 B2 | | 2/2013 | Söderlund |
| 2003/0100638 A1 | | 5/2003 | Yamamuro |
| 2005/0173255 A1 | * | 8/2005 | Bokisa ................... C25D 3/562 |
| | | | 205/255 |
| 2005/0256328 A1 | * | 11/2005 | Justus ....................... A61P 7/06 |
| | | | 556/147 |
| 2007/0023280 A1 | * | 2/2007 | Eckles ................... C25D 17/12 |
| | | | 204/232 |
| 2009/0107845 A1 | * | 4/2009 | Arzt ....................... C25D 17/002 |
| | | | 204/240 |
| 2016/0038604 A1 | * | 2/2016 | Holbein ............... A61K 31/718 |
| | | | 424/78.32 |
| 2016/0047056 A1 | * | 2/2016 | Deloye ..................... C25D 7/00 |
| | | | 205/245 |

FOREIGN PATENT DOCUMENTS

| | | | | |
|---|---|---|---|---|
| JP | | 3486087 A | 1/2004 | |
| JP | | 2014198882 A | 10/2014 | |
| WO | WO-2007025606 A1 | * | 3/2007 | ............... C08G 2/08 |
| WO | WO-2016169952 A1 | * | 10/2016 | ............. C25D 21/00 |

OTHER PUBLICATIONS

Chinese Office Action for Application No. 201780032660.X dated Jun. 10, 2020.
Chinese Office Action for Application No. 201780032660.X dated Jan. 12, 2021; 13 pgs.
Korean Office Action dated Jul. 1, 2021.

* cited by examiner

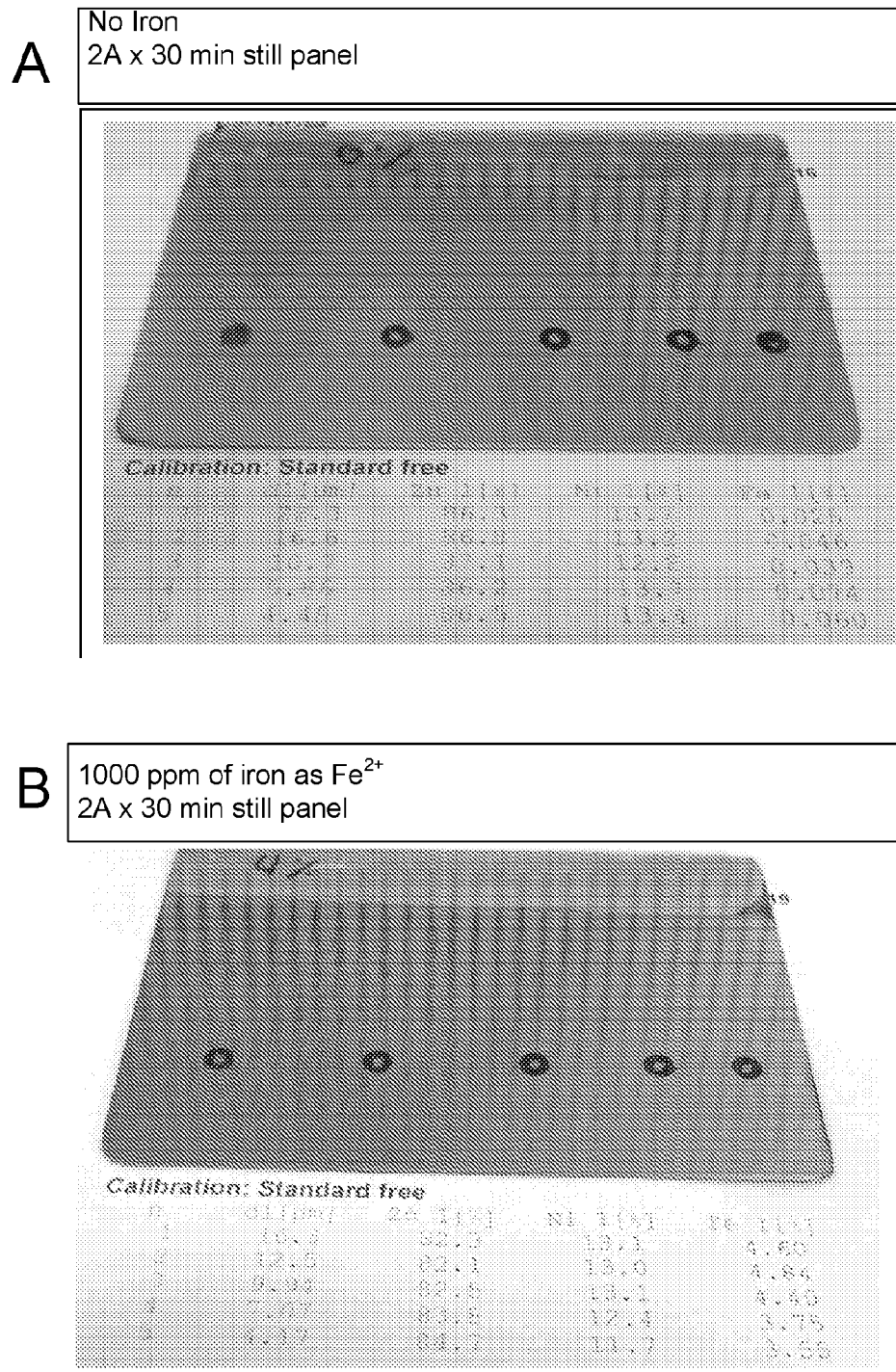
Figs. 1A-B

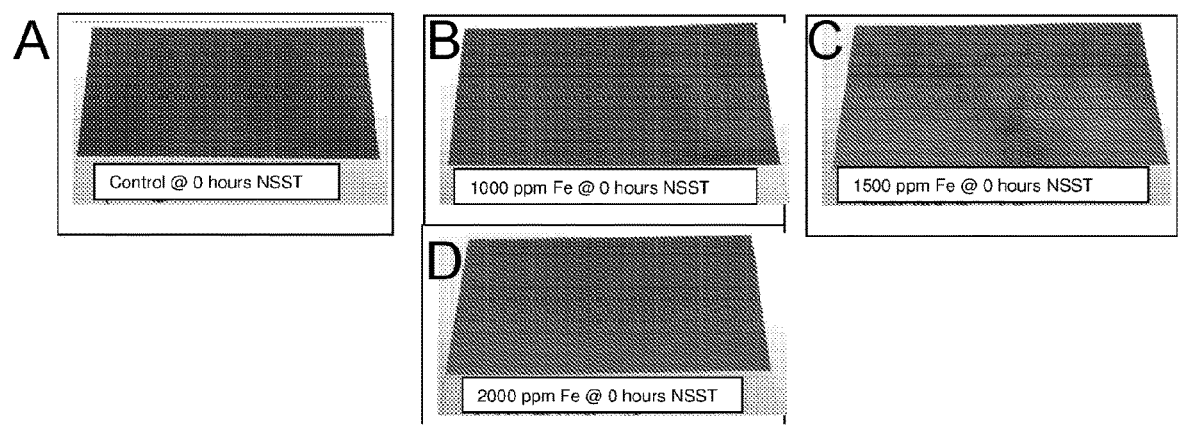
Figs. 2A-D
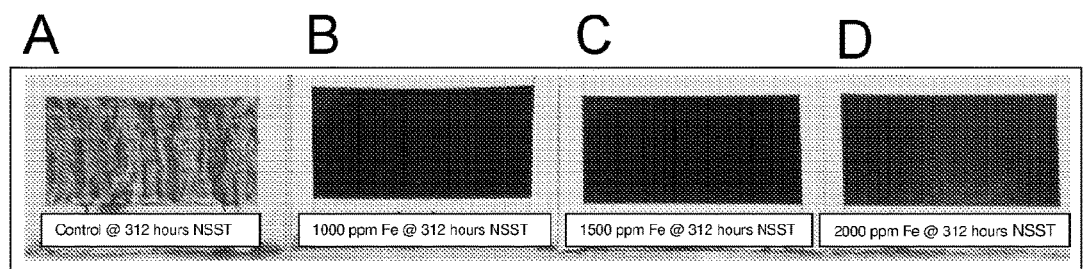
Figs. 3A-D

A
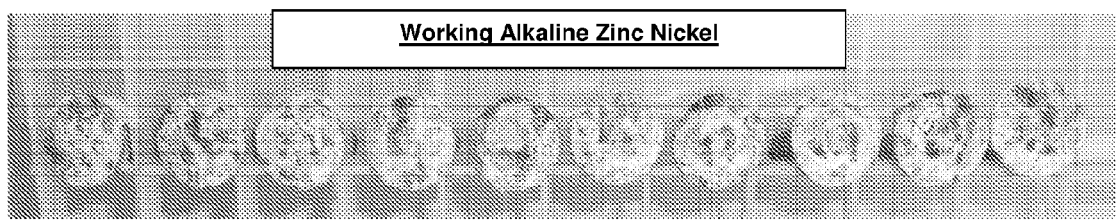
B
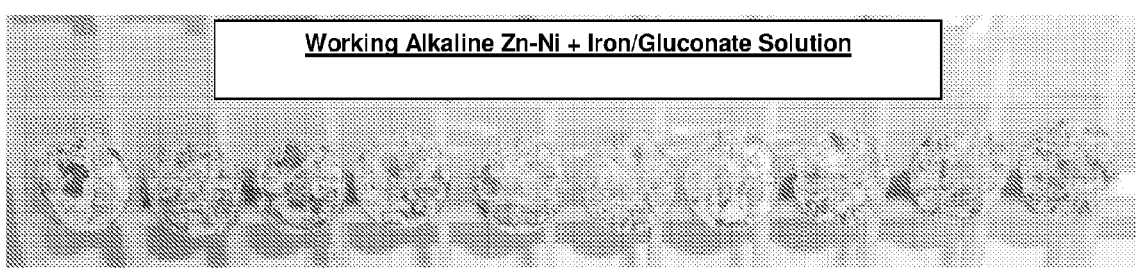
Figs. 4A-B

TERNARY ZINC-NICKEL-IRON ALLOYS AND ALKALINE ELECTROLYTES OR PLATING SUCH ALLOYS

RELATED APPLICATION

This application claims benefit from U.S. Provisional Application No. 62/340,759, filed May 24, 2016, the subject matter of which is incorporated by reference in its entirety.

BACKGROUND

Corrosion resistance of metal parts has been sought since man developed metal implements. It has been well known that steel parts corrode (rust). To prevent such corrosion, metal coatings have been developed that protect the substrate both by 1) being more corrosion resistant than the iron and 2) being sacrificially corroded preferentially to the substrate.

One such coating is zinc plating. Electroplated zinc yields a sacrificial coating that protects the iron substrate. Corrosion resistance of the zinc deposit has been improved through the use of chromate and other passivation films as well as organic and silicone based sealers. However, while these secondary coatings do improve corrosion resistance as a whole, they do not improve the zinc corrosion resistance. To that end, electrodeposited zinc binary alloys, such as Zn—Ni, Zn—Co, and Zn—Fe, have been developed. These alloys have a dual function in that they are inherently more corrosion resistant than Zn alone and they promote more effective conversion coatings, further enhancing corrosion resistance.

JP 1298192A discloses an alkaline cyanide-free zinc nickel plating solution having a pH greater than 13. The plating solution contains zinc ions, nickel ions, and one or more amine chelating agents selected from N-aminoethylethanolamine, ethylenediamine, diethylenetriamine, triethylenetetramine, tetraethylenepentamine, and pentaethylenehexamine, and an effective amount of a brightener, such as a quaternary pyridine compound.

U.S. Pat. No. 5,405,523 discloses a zinc alloy electroplating bath comprising a ureylene quaternary ammonium polymer as a brightening agent. The bath can also contain a supplemental brightener. One suitable supplemental brightener which is listed is n-benzyl nicotinic acid (sodium salt). Nickel is listed as a metal which can be alloyed with the zinc.

U.S. Pat. No. 4,889,602 discloses an alkaline zinc-nickel electroplating bath which comprises an aliphatic amine or polymer of an aliphatic amine in combination with an hydroxyaliphatic carboxylic acid.

U.S. Pat. Nos. 4,071,418 and 4,071,419 disclose the combination of amines with substituted pyridines, such as nicotinic acid or nicotinamide for a zinc bath.

U.S. Pat. No. 5,417,840 discloses an alkaline zinc-nickel plating bath comprising a polyamine, such as polyethyleneimine, in combination with an aromatic heterocyclic nitrogen containing compound, such as a sulfo-betaine, e.g., pyridinium-N-propane-3-sulfonic acid; or a pyridinium chloride such as N-carboxymethyl pyridinium chloride.

U.S. Pat. Nos. 4,730,022 and 4,210,500 disclose the use of an aromatic carboxyl compound such as 1-benzyl-pyridinium-3-carboxylate or 3-pyridine carboxylic acid (nicotinic acid) as a supplementary brightener in an alkaline zinc bath. The carboxyl compounds are used in combination with a primary brightener, such as the reaction product of a polyamine and a sulfonate.

U.S. Pat. No. 6,468,411 discloses an alkaline zinc-nickel electroplating bath that includes zinc ions, nickel ions, a primary brightener, which is an N-methylpyridinium compound, and a secondary brightener, which is an aliphatic amine.

U.S. Pat. No. 6,652,728 discloses an aqueous alkaline cyanide-free bath for the galvanic deposition of zinc or zinc alloy coatings on substrate surfaces. The bath includes a source of zinc ions, hydroxide ions, optionally a source of further metal ions, a quaternary ammonium polymer, and a quaternary derivative of a pyridine-3-carboxylic acid.

U.S. Pat. No. 7,442,286 discloses an electroplating bath for depositing a zinc-nickel ternary or higher alloy. The electroplating bath includes zinc ions, nickel ions, and one or more ionic species selected from ions of $Te^{+4}$, $Bi^{+3}$ and $Sb^{+3}$, and in some embodiments one or more additional ionic species selected from ions of $Bi^{+3}$, $Sb^{+3}$, $Ag^{+1}$, $Co^{+2}$, $Cr^{+3}$, $Cu^{+2}$, $Fe^{+2}$, $In^{+3}$, $Mn^{+2}$, $Mo^{+6}$, $P^{+3}$, $Sn^{+2}$ and $W^{+6}$, one or more non-ionogenic surface active polyoxyalkylene compounds, ethylenediamine, propylenediamine, diethylenetriamine, or a polymer of an aliphatic amine.

SUMMARY

Embodiments described herein relate to a ternary zinc-nickel-iron alloy plating system that includes an aqueous alkaline zinc-nickel-iron electroplating bath. The aqueous alkaline zinc-nickel-iron electroplating bath can be used to electroplate or electrodeposit ternary zinc-nickel-iron alloy coatings on electrically conductive substrates, which are contacted with or provided in the alkaline zinc-nickel-iron electroplating bath. The zinc-nickel-iron ternary alloy can include, for example, by weight, about 7% to about 16% nickel, about 0.5% to about 8% iron, and balance zinc. The ternary zinc-nickel-iron alloy coatings are aesthetically appealing, form shiny, bright surfaces, and have improved corrosion resistance and receptivity of passivation films compared to zinc or zinc-nickel electroplates.

In some embodiments, the aqueous alkaline electroplating bath can include zinc ions, nickel ions, and iron ions. The iron ions are provided in the aqueous alkaline electroplating bath as a complex of a water soluble iron salt and an iron complexing agent.

In some embodiments, the iron complexing agent includes one or more of hydroxyl, amine, or carboxylate functionality. In other embodiments, the iron complexing agent is a hydroxycarboxylate, such as sodium gluconate, sodium tartrate, sodium citrate, sodium hydroxybutyrate, potassium gluconate, potassium tartrate, potassium citrate, and/or potassium hydroxybutyrate.

In other embodiments, the bath can include an amount of a nickel complexing agent effective to keep the nickel ions soluble in the bath. The nickel complexing agent can be, for example, at least one of an aliphatic amine, alkyleneimine, polyalkyleneimine, polyamine, amino alcohol, carboxylic acid, or sodium or potassium salt thereof.

In some embodiments, the aqueous alkaline electroplating bath is free of a polyoxyalkylene compound and a quaternary polymer.

In other embodiments, the aqueous alkaline electroplating bath includes a brightener. The brightener can be, for example, at least one of N-methylpyridinium-3-carboxylate or salt thereof (trigonelline), 1-benzylnicotinate, or sulfopropylpyridinium.

In still other embodiments, the aqueous alkaline zinc-nickel-iron electroplating bath, can include about 4 grams per liter to about 50 grams per liter of zinc; about 0.1 grams per liter to about 10 grams per liter nickel; about 0.1 gram per liter to about 10 grams per liter iron; and about 50 grams per liter to about 220 grams per liter of an alkaline compound effective to provide the bath with a pH more than about 13; and about 2 g/l to about 200 g/l of a nickel complexing agent. The iron can be provided in the aqueous alkaline electroplating bath as a complex of a water soluble iron salt and an iron complexing agent.

Still other embodiments relates to a method for obtaining a ternary zinc-nickel-iron electroplate. In the method, an aqueous alkaline zinc nickel electroplating bath comprising zinc ions, nickel ions, and a nickel complexing agent is prepared. A complex of a water soluble iron salt and an iron complexing agent is also prepared. The complex is added to the aqueous alkaline zinc nickel electroplating bath to form an aqueous alkaline zinc-nickel-iron electroplating bath. A substrate to be electroplated is positioned in the aqueous alkaline zinc-nickel-iron electroplating bath and electroplated to provide a ternary zinc-nickel-iron electroplate on the substrate.

In some embodiments, a passivate can be provided over the zinc-nickel-iron electroplated substrate to enhance the corrosion resistance of the electroplate. The passivate can be clear or black and include, for example, a trivalent chromium passivate that is free of hexavalent chromium.

In other embodiments, the substrate can be an aluminum substrate or steel substrate, such as an aluminum electrical connector.

Other embodiments described herein relate to an electrical connector. The electrical connector includes an aluminum substrate, a zinc-nickel-iron ternary alloy electroplated on the substrate and a passivate provided on the zinc-nickel-iron ternary alloy electroplate. The zinc-nickel-iron ternary alloy can include, by weight, about 7% to about 16% nickel, about 0.5% to about 8% iron, and balance zinc. The passivate can include a chromium coating, such as a trivalent chromium coating that is free of hexavalent chromium.

BRIEF DESCRIPTION OF THE DRAWINGS

FIGS. 1(A-B) illustrate images showing panels plated with a zinc-nickel-iron alloy plating system in accordance with one embodiment and a comparative zinc-nickel-iron alloy plating system.

FIGS. 2(A-D) illustrate images showing a control panel and panels plated with a zinc-nickel-iron alloy plating system in accordance at various thickness prior to accelerated corrosion testing per ASTM B117.

FIGS. 3(A-D) illustrate images showing the control panel and panels plated with a zinc-nickel-iron alloy plating system of FIG. 2 after 312 hours of accelerated corrosion testing per ASTM B117.

FIGS. 4(A-B) illustrate images showing bolt heads plated with a zinc-nickel-iron alloy plating system in accordance with one embodiment and a comparative zinc-nickel-iron alloy plating system.

DETAILED DESCRIPTION

Embodiments described herein relate to a ternary zinc-nickel-iron alloy plating system that includes an aqueous alkaline zinc-nickel-iron electroplating bath. The aqueous alkaline zinc-nickel-iron electroplating bath can be used to electroplate or electrodeposit ternary zinc-nickel-iron alloy coatings on electrically conductive substrates, which are contacted with or provided in the alkaline zinc-nickel-iron electroplating bath. The ternary zinc-nickel-iron alloy coatings are aesthetically appealing, form shiny, bright surfaces, and have improved corrosion resistance and receptivity of passivation films compared to zinc or zinc-nickel electroplates.

The ternary zinc-nickel-iron alloy can be electroplated or electrodeposited by passing an electrical current from an anode through the alkaline zinc-nickel-iron electroplating bath or conductive medium containing zinc ions, nickel ions, and iron ions while the bath or conductive medium is in contact with the electrically conductive substrate, which functions as a cathode. In some embodiments, the electrically conductive substrate can include iron, ferrous based substrates (e.g., iron alloys and steel), aluminum, aluminum alloys, magnesium, magnesium alloys, copper, copper alloys, nickel, nickel alloys, zinc, and zinc alloys.

The alkaline zinc-nickel-iron electroplating bath includes a controlled amount of zinc ions, nickel ions, and iron ions in an alkaline aqueous solution. The pH of the alkaline plating bath can be from about 9 to about 13 or higher, such as above about 14. The bath contains an alkaline component or base that is provided in an aqueous solution at an effective amount to achieve this pH. Amounts of from about 50 grams of base per liter of electroplating bath to about 220 grams per liter, or about 110 grams per liter to about 160 grams per liter, can be used. Examples of bases that can be used are alkali metal derivatives, such as sodium hydroxide, potassium hydroxide, sodium carbonate, potassium carbonate, sodium bicarbonate, and potassium bicarbonate.

The source for the zinc ions for the electroplating bath can be any zinc compound, which is soluble in an alkaline aqueous medium. Examples of zinc compounds that can be used as a source of the zinc ions in the electroplating bath are zinc oxide, zinc sulfate, zinc sulfamate, zinc hydroxide, zinc carbonate, zinc acetate, and zinc tartrate, although other zinc compounds can be provided in the bath. The concentration of zinc ions in the electroplating bath can be from about 1 gram per liter to about 100 grams per liter, preferably about 4 grams per liter to about 50 grams per liter (about 4,000 to about 50,000 ppm).

The source for the nickel ions for the electroplating bath can be any nickel compound, which can be made soluble in an aqueous alkaline solution. Examples of suitable nickel compounds are an inorganic or organic acid salt of nickel, such as nickel sulfate, nickel carbonate, nickel acetate, nickel sulfamate and nickel formate. The concentration of nickel ions in the electroplating bath can be from about 0.1 gram per liter to about 10 grams per liter, (about 100 to about 10,000 ppm), more preferably in the range from about 0.1 gram per liter to about 3 grams per liter (about 100 ppm to about 3,000 ppm).

At least one complexing agent can also be provided in the electroplating bath with the nickel compound to maintain nickel solubility and to bring deposition potentials of the deposited metals closer so as to provide common reduction of deposited metal and form metal alloyed deposits. In some embodiments, the complexing agent may be any complexing agent known in the art. In other embodiments, the complexing agent is a complexing agent suitable for nickel ion.

In some embodiments, the at least one complexing agent can include an aliphatic amine, such as monoethanolamine (MEA), diethanolamine (DEA), triethanolamine (TEA), ethylenediamine, diethylenetriamine (DETA), imino-bis-propylamine, polyethyleneimine, triethylenetetramine, tetraethylenepentamine (TEPA), hexamethylenediamine, and combinations thereof. Alkyleneimines and poly(alkyleneimines) can also be used, along with polyamines, such as ethylenediamine, triethylenetetramine; amino alcohols, such as N-(2-aminoethyl) ethanolamine, 2-hydroxyethylaminopropylamine, N-(2-hydroxyethyl)ethylenediamine, etc. The poly(alkyleneimines) may have molecular weights of from about 100 to about 100,000 or more although the higher molecular weight polymers are not generally as useful since they have a tendency to be insoluble in the electroplating baths.

Other examples of complexing agents include N-(2-hydroxyethyl)-N,N',N'-triethylethylenediamine; N,N'-di(2-hydroxyethyl)N,N'-diethyl ethylenediamine; N,N-di(2-hydroxyethyl)-N',N'-diethyl ethylenediamine; N,N,N',N'-tetrakis(2-hydroxyethyl)ethylenediamine; N,N,N',N'-tetrakis(2-hydroxyethyl)propylenediamine; and N,N,N',N'-tetrakis(2,3-dihydroxypropyl)ethylenediamine; N,N,N',N'-tetrakis(2,3-dihydroxypropyl)propylenediamine; N,N,N',N'-tetrakis(2-hydroxypropyl)ethylenediamine; N,N,N',N'-tetrakis(2-hydroxyethyl)1,4-diaminobutane. An example of a commercially available metal complexing agent is Quadrol from BASF. Quadrol is N,N,N',N'-tetrakis(2-hydroxypropyl)ethylenediamine.

Carboxylic acids can also be used in combination with the amines. For example, citric acid, tartaric acid, gluconic acid, alpha-hydroxybutyric acid, and sodium and/or potassium salts of the carboxylic acids can be used.

In some embodiments, the at least one complexing agent can include one or more polymer of an aliphatic amine Examples of polymers of aliphatic amines that can be used as a complexing agent include poly(alkyleneimines) obtained from ethyleneimine, 1,2-propyleneimine, 1,2-butyleneimine, and 1,1-dimethylethyleneimine.

The at least one complexing agent may be contained individually or as a mixture in the bath. The total amount of the at least one complexing agent provided in the electroplating bath can be about 2 g/l to about 200 g/l.

The source for the iron ions can be a complex of a water soluble iron salt and an iron complexing agent. It was found that the addition of iron salts, such as ferrous sulfate, to an alkaline electroplating solution comprising the zinc ions and nickel ions in the presence of a variety of complexing agents, does not yield a substantial amount of iron in the ternary zinc-nickel-iron alloy deposit upon electrodeposition. However, addition of a water soluble iron salt, such as ferrous sulfate, as a complex with an iron complexing agent, such as sodium gluconate, to the alkaline electroplating solution containing the zinc ions, nickel ions, and the one or more complexing agents, enhanced the amount or percent of iron in the ternary zinc-nickel-iron alloy deposit upon electrodeposition, essentially as a ratio of the iron in solution. Advantageously, the complex of the iron salt and the iron complexing agent is set up or formed prior to addition to the alkaline electroplating bath containing the zinc ions, nickel ions, and the one or more complexing agents to inhibit the iron salt from forming hydroxides and other undesirable salts with other components of the alkaline electroplating bath that are either marginally soluble or do not allow for incorporation into the deposit.

In some embodiments the iron salt used in the formation of the carboxylate complex can include ferrous or ferric salts of iron, such as $Fe_2(SO_4)_3 \cdot 7H_2O$, $FeSO_4 \cdot 7H_2O$, $Fe(OH)_3$, $FeCl_3 \cdot 6H_2O$, and $FeCl_2 \cdot 4H_2O$. The iron complexing agent used in the formation of the complex can include one or more of hydroxyl, amine, or carboxylate functionality.

In some embodiments, the iron complexing agent can be a hydroxycarboxylate, such as sodium gluconate, sodium tartrate, sodium citrate, sodium hydroxybutyrate, potassium gluconate, potassium tartrate, potassium citrate, and/or potassium hydroxybutyrate.

In other embodiments, the iron complexing agent can be an aliphatic amine, such as monoethanolamine (MEA), diethanolamine (DEA), triethanolamine (TEA), ethylenediamine, diethylenetriamine (DETA), imino-bis-propylamine, polyethyleneimine, triethylenetetramine, tetraethylenepentamine (TEPA), hexamethylenediamine, and combinations thereof, alkyleneimines, poly(alkyleneimines), and/or amino alcohol.

The ratio of iron salt to iron complexing agent used to form the complex is that amount effective to form the carboxylate complex and can be about 0.1:10 to about 10:1.

The concentration of iron ions in the electroplating bath provided by the complex can be from about 0.1 gram per liter to about 25 grams per liter, (about 100 to about 25,000 ppm), more preferably, in the range from about 0.1 gram per liter to about 10 grams per liter (about 100 ppm to about 10,000 ppm).

The alkaline electroplating bath can contain in addition to the zinc ions, nickel ions, iron ions, and complexing agents, one or more additives commonly used in a zinc or zinc-alloy electroplating bath that improves an aspect of the electroplating process. Examples of aspects of the electroplating process that can be improved include the physical properties of the electroplate and the metal complexing properties of the bath.

In some embodiments, a brightening agent or brightener can be added to the electroplating bath. Examples of brighteners that can be potentially added to the electroplating bath include the condensation product of piperazine, guanidine, formalin, and epichlorohydrin, as defined in U.S. Pat. No. 4,188,271; pyridinium propyl sulfonate; N-benzyl-3-carboxy pyridinium chloride; trigonelline; Golpanol PS (sodium propargyl sulphonate); propargyl alcohol; ethyleneglycolpropargylalcohol ether; BEO (ethoxylated butyne diol); Aerosol AY65 (sodium diamylsulfosuccinate); N,N'-bis[3-(dimethylamino)propyl]urea, polymer with 1,3-dichloropropane—see U.S. Pat. No. 6,652,726 B1; carboxyethylisothiuronium betaine; Rewopol EHS (ethyl hexyl sulfate); benzothiazole; Lutensit A-PS (a proprietary anionic surfactant from BASF); Lugalvan BPC 34 (a 34 wt % aqueous solution of N-benzyl nicotinate); benzyl-2-methylimidiazole; Tamol NN (a formaldehyde condensate of 2-naphthalene sulfonate); methyl naphthyl ketone; benzalacetone; Lutensit CS40 (40% cumene sulfonate); Golpanol VS (sodium vinyl sulfonate); benzothiazolium-2-[4-(dimethylamino)phenyl]-3,6-dimethyl chloride; DPS(N,N-dimethyldithiocarbamyl propyl sulfonic acid sodium salt); MPS (3-mercapto-1-proanesulfonic acid, sodium salt); OPS(O-ethyldithiocarbonato-S-(3-sulfopropyl)-ester, potassium salt); SPS (bis-(3-sulfopropyl)-disulfide, disodium salt); UPS (3-S-iosthiouronium propyl sulfonate); ZPS (3-(benzothiazolyl-2-mercapto)-propyl-sulfonic acid, sodium salt) (DPS, MPS, OPS, SPS, UPS and ZPS are available from Raschig GmbH); N-(polyacrylamide); safranin; crystal violet and derivatives thereof; phenazonium dyes and derivatives thereof; Lugalvan. HT (thiodiglycol ethoxylate); sodium lauryl sulfate; Dequest (1-hydroxyethylen-1,1-diphosphonic acid); Lugalvan BNO (ethoxylated beta naphthol); Lugalvan NES (sodium salt of a sulphonated alkylphenol ethoxylate); sulfurized benzene sulfonic acid; butynediol dihydroxypropyl sulfonate; sodium saccharin; MPSA (3-mercapto-1-propanesulfonic acid, sodium salt); the formaldehyde condensate of 1-naphthalene sulfonic acid; benzotriazole; tartaric acid; EDTA (ethylenediamine tetraacetic acid); sodium benzoate; the aqueous reaction product of 2-aminopyridine with epichlorohydrin; Mirapol A15 (ureylene quaternary ammonium polymer); the aqueous reaction product of imidazole and epichlorohydrin; vanillin; anisaldehyde; Heliotropin (piperonal); thiourea; polyvinyl alcohol; reduced polyvinyl alcohol; o-chlorobenzaldehyde; α-napthaldehyde; condensed naphthalene sulfonate; niacin; pyridine; 3-hydroxypropane sulfonate; allyl pyridinium chloride; dibenzenesulfonamide; pyridinium butane sulfonate; sodium allyl sulfonate; sodium vinyl sulfonate; naphthalene trisulfonic acid; cumene sulfonate; CMP (carboxymethylpyridinium chloride); Golpanol 9531 (propargyl hydroxypropyl ether sulfonate); o-sulfobenzaldehyde; Lugalvan ES-9571 (aqueous reaction product of imidazole and epichlorohydrin); mercaptothio ether; PVP (polyvinylpyrrolidone); sodium adipate; chloral hydrate; sodium gluconate; sodium salicylate; manganese sulfate; cadmium sulfate; sodium tellurite; and glycine. The foregoing list is not exhaustive and is exemplary only. Any other known brightener useful in electroplating zinc, nickel, and/or iron may be useful herein.

The amount of brightener provided in the bath can range from about 0.01 g/l to about 10 g/l (about 10 ppm to about 10,000 ppm).

The electroplating baths may further contain known leveling agents, such as 3-mercapto-1,2,4-triazole and/or thiourea, the latter being preferred. The concentration of the leveling agent is the normal concentration for use in zinc baths, and ranges, for example, from 0.01 to 0.50 g/l. Further additives for the baths described herein include aromatic aldehydes or their bisulfite adducts.

The baths described herein may also contain a water-softener, since the sensitivity of the bath to foreign metal ions, in particular calcium and magnesium ions from tap water, is reduced by the use of such additives. Examples of such water-softeners are EDTA, sodium silicates, and tartaric acid.

In some embodiments, the electroplating bath can be free of or does not contain a polyloxyalkylene compound and a quaternary polymer. By omitting polyloxyalkylene compounds and a quaternary polymers from the electroplating baths, the simplicity of the plating system can be enhanced as well as waste treatment can be reduced. Examples of polyalkylene compounds include non-ionogenic surface active polyoxyalkylene compounds described in U.S. Pat. No. 7,442,286. Examples of quaternary polymers include quaternary ammonium polymers described in U.S. Pat. Nos. 5,405,523, 5,435,898, 6,652,728, and 7,964,083.

The aqueous alkaline electroplating bath can prepared by dissolving the zinc compound, nickel compound, one or more nickel complexing agents and optionally other additives, such as a brightener, in a commercially available caustic solution and then adjusting the concentration of the solution to that desired by adding water to the solution. For instance, about 10 grams of zinc oxide, about 5.4 grams of nickel sulfate, 0.5 grams of trigonelline solution, about 24.4 grams of tetraethylenepentamine (TEPA), about 0.65 grams of diethylenetriamine (DETA), and about 13 grams of triethanolamine can be dissolved or mixed in 75 ml of a 50% caustic solution, which is then diluted to the desired volume percent by the addition of water. If desired, the pH of the bath can be adjusted by adding to the bath the parent base of the caustic solution, or another base, such as sodium or potassium carbonate.

The complex of a water soluble iron salt and an iron complexing agent can be prepared by dissolving, for example, about 125 grams the iron salt (e.g., $FeSO_4 \cdot 7H_2O$) and about 100 grams of the complexing agent (e.g., sodium gluconate) in about one liter of water and allowing the iron salt and hydrocarboxylate complexing agent sufficient time to complex. The solution of complex can then be added to the alkaline zinc-nickel electroplating bath at amount sufficient to provide iron ions in the bath at an iron ion concentration of about 0.1 gram per liter to about 25 grams per liter.

The aqueous alkaline electroplating baths can be used at conventional current densities, for example, about 1 to 100 amps per square foot, as determined by Hull Cell evaluation. In some embodiments, the bath can be operated with an average cathode current density in the range of about 3 amps per square foot to about 25 amps per square foot, typically about 20 amps per square foot. The cathode current density is dependent upon the particular type of deposit desired. Bright deposits can be obtained at conventional temperatures, for instance about 20° C. to about 40° C.

The electrodeposition using the electroplating bath may, for example, be carried out as a drum galvanizing process when used for mass parts, and as a frame galvanizing process for deposition on larger workpieces. Anodes can be used that are soluble, such as zinc anodes, and that at the same time can serve as a source of zinc ions so that the zinc deposited on the cathode is recovered by dissolution of zinc at the anode. Alternatively, insoluble anodes such as nickel and/or iron anodes, may also be used, wherein the zinc ions removed from the electrolyte have to be replenished in another way, for example, by using a zinc dissolving tank.

The electroplating baths described herein may be operated on a continuous or intermittent basis and, from time to time, the components of the bath may have to be replenished. The various components may be added singularly as required or may be added in combination. The amounts of the various components to be added may be added on either a continuous basis or on an intermittent bases. The concentrations may be determined at appropriate intervals based on experience, or may be continuously determined, for example, by automated analytical instrumentation. The amounts of the various components to be added to the electroplating bath may be varied over a wide range depending on the nature and the performance of the electroplating baths to which the components are added. Such amounts can be determined readily by one of ordinary skill in the art.

The ternary zinc-nickel-iron alloy electrodeposited on the substrate can include or consist essentially of, for example, about 7 wt. % to about 16 wt. % nickel, about 0.5 wt. % to about 8 wt. % iron, and the balance Zn, preferably, about 70 wt. % to about 86 wt. % zinc, about 10 wt. % to about 15 wt. % nickel, and about 1 wt. % to about 8 wt. % iron, and more preferably, about 75 wt. % to about 85 wt. % zinc, about 12.5 wt. % to about 13.5 wt. % nickel, and about 1 wt. % to about 8 wt. % iron. Advantageously, the weight percent of iron provided within the deposit is uniform and predictable. Essentially, every 250 ppm of $Fe^{2+}$ added to a standard aqueous alkalkine zinc-nickel electroplating solution increases the iron contribution within the deposit by about 1% wt/wt. Surprisingly, increasing the iron wt. % within the alloy does not impact the nickel percentage, but rather, comes at the expense of zinc. In a commercial environment, this is important because controlling the alloy becomes a fairly simple paradigm where if the nickel and zinc values are held static, the alloy can be manipulated simply by changing the iron value to yield the desired alloy.

In some embodiments, to improve corrosion resistance of substrates electroplated with the ternary zinc-nickel-iron alloy, the surfaces of the electroplated substrates can be treated with a corrosion resistance passivate or passivation formulation. A variety of corrosion resistance passivation formulations are available. For example, U.S. Pat. No. 7,314,671 describes chromium (VI)-free conversion layer and method for producing it. U.S. Pat. Nos. 6,375,726 and 4,384,902 discloses trivalent chromium passivate composition and process. Other corrosion resistant passivation formulation for zinc electrodeposits can include a coat of organic, inorganic or hybrid polymer. Such polymer formulations are referred as Sealers, Fixers or Topcoats in the industrial practice.

Advantageously, the zinc-nickel-iron ternary alloy described herein can be electrodeposited on an aluminum substrate, such as an aluminum electrical connector, to enhance corrosion resistance of the aluminum connector and improve electrical conductivity of the connector when mated to a similar connector. Traditionally, aluminum connectors undergo a plating process that includes a standard aluminum pre-plate, including cleaning and electrodeposition of zincate, followed by an electroless nickel coating. The connector can then be plated with cadmium, followed by a hexavalent passivate. This traditional process is environmentally unfriendly. To facilitate the elimination of both the cadmium and hexavalent chromium, the traditional process was replaced with zinc-nickel electroplate and a trivalent passivate. Over time, the corrosion products from the zinc-nickel/passivate are manifest on the connector. These corrosion salts hinder the conductivity of the connector and their reduction is desired to improve both the function and the life of the connector. To that end, a further improvement is achieved to the connector by the replacement of the zinc-nickel alloy with the zinc-nickel-iron ternary alloy described herein. The increased corrosion resistance of the Zn—Ni—Fe alloy reduces the preponderance of corrosion locations on the connector, improving its overall electrical conductivity when mating. Further, the use of the ternary Zn—Ni—Fe alloy produces a more aesthetically desired black passivate, again with improved corrosion protection. This further improved corrosion protection yet again minimizes the proliferation of corrosion salts on the surface, continuing to improve the conductivity of the connector.

The following examples are included to demonstrate various aspects of the invention. Those of skill in the art should, in light of the present disclosure, appreciate that many changes can be made in the specific aspects which are disclosed and still obtain a like or similar result without departing from the spirit and scope of the invention.

Examples

A commercially aviable zinc-nickel solution was constructed that contained:

| | |
|---|---|
| Zinc Oxide | 10 g/L |
| Sodium hydroxide | 155 g/L |
| Nickel Sulfate Hexahydrate | 5.4 g/L |
| Trigonelline solution | 0.52 g/L |
| TEPA | 24.4 g/L |
| DETA | 0.65 g/L |
| Triethanolamine | 13.0 g/L |

The bath was then augmented with soluble iron (ferrous sulfate) to form a ternary Zn—Ni—Fe alloy. The addition of just Ferrous sulfate to the solution, even in the presence of a variety of complexing agents, did not yield a substantial amount of Fe in the deposit. However, when the ferrous sulfate was introduced as a carboxylate complex with gluconate (or alternatively, tartrate), then iron in the deposit substantially increased, essentially as a ratio of the iron in solution. The iron was capable of depositing from either the ferrous or ferric state as long as it was complexed first with gluconate. In practice, it took about 50% more ferric ion in solution to get the same amount of iron in the deposit.

In the Examples described below, the complexed $Fe^{2+}$ was added to the alkaline Zn—Ni bath using the following solution. The solution yields an iron content of 25,000 ppm as $Fe^{2+}$.

125 g/L $FeSO_4 \cdot 7H_2O$
100.8 g/L Sodium Gluconate

Performance testing of the bath was done using a standard 2 A×30 minute, 267 mL Hull Cell, so that a range of current densities (<1 to >100 Amps per square foot) could be interpreted. All plating performance testing described was done at room temperature (20-26° C.). As illustrated in FIG. 1A, the basic solution, with no Fe produced a deposit with slight low current density brightness, as evidenced by the reflected stripes seen on the right side of the panel. However, as shown in FIG. 1B when the Fe was introduced and incorporated into the deposit, the entirety of the panel appearance was improved and the striped reflection can be seen over the entire range of the of the panel.

One can also note that the Fe in deposit, by XRF analysis, was around 4% wt/wt, yielding a Zn—Ni—Fe ternary alloy of essentially 83-13-4%, respectively. Such a visual improvement has heretofore not been observed with no other changes to the bath parameters outside of increased iron concentration from an alkaline electrolyte.

Also of note, within these bath plating parameters, the iron increase within the deposit was uniform and predictable. Essentially, every 250 ppm of $Fe^{2+}$ added to the solution increases the Fe contribution within the deposit by about 1% wt/wt. Of further interest, increasing the Fe within the alloy does not impact the Ni percentage, but rather, comes at the expense of Zn. In a commercial environment, this is important because controlling the alloy becomes a fairly simple paradigm where if the nickel and zinc values are held static, the alloy can be manipulated simply by changing the iron value to yield the desired alloy. By way of example, holding the zinc concentration constant at 8 g/L and the nickel at 1200 ppm, the ternary alloy yields were as follows at a plating current density of 20 amps/ft². Again, note how stable and predictable the Ni content is:

| Fe concentration | Deposit Thickness | Composition of Alloy as a weight percent | | |
|---|---|---|---|---|
| (ppm) | (microns) | Zn | Ni | Fe |
| 0 | 10.7 | 87.1 | 12.9 | 0.0 |
| 250 | 9 | 85.1 | 13.2 | 1.7 |
| 500 | 10.4 | 84.2 | 13.4 | 2.4 |
| 1000 | 9.9 | 82.5 | 13.1 | 4.4 |
| 2000 | 10.3 | 79.1 | 13.0 | 7.9 |

While improvement in the deposit specularity with the incorporation of Fe is surprising, it is not the only unanticipated improvement with the invention. Corrosion resistance was also enhanced with the ternary alloy. Further, corrosion resistance of the zinc and zinc plated alloys is itself enhanced through the use of passivates. Passivates serve two purposes. 1) as well as the alloy itself, the passivate also enhances corrosion resistance: and 2) passivates allow for changing the color of the final product. There is a commercial desire within the industry to yield parts that are not only in some cases "metallic" looking, but also parts to be uniformly black in color. Colored with improved corrosion resistance is the ultimate goal.

To demonstrate the enhanced corrosion resistance of the alloy, a series of panels were produced using a duplicell so that more uniform thickness could be achieved on the panels. Plating solutions were maintain constant at 8 g/L zinc, 1100 ppm nickel, and the iron content was varied at essentially 1000, 1500 and 2000 ppm as $Fe^{2+}$. Panels were then all plated to essentially 10 micron thickness at a nominal 15 Amps/ft$^2$, yielding nickel alloys of 13+/−2% and iron contents of 4, 6 and 8% respectively for the 1000, 1500 and 2000 ppm contents. Each panel set was then exposed to the same commercial black trivalent passivate, applied under like conditions. A standard zinc-nickel plated panel set, containing no iron and plated under like conditions was used as a control.

FIGS. 3(A-D) illustrate the panels prior to accelerated corrosion testing. What is not overly apparent from the pictures is how significantly more reflective the panels are that contain the iron and the passivate film, while perhaps not as dark as the control, the ternary alloy panels appear to have a more substantial passivate film.

The panels were then exposed to neutral salt spray for accelerated corrosion testing per ASTM B117. FIGS. 4(A-D) illustrate the panels after 312 hours salt spray exposure. A vast difference in the corrosion protection was afforded by the ternary alloy. On the control, not only was red rust visible, indicating attack on the steel substrate, but the white corrosion products, which were more pronounced were indicative of attack on the zinc-nickel alloy. The ternary alloy showed just a hint of white corrosion on the very high Fe alloy panel and no signs of red rust, which means the substrate was completely protected.

To verify the profound difference, a second test was done using panels produced in essentially a like manner. The differences of this panel set were the use of a clear passivate, post plating and a lower Fe percentage, between zero and 4%.

The matrix was set up as follows:
Set A: 8 microns standard alkaline zinc nickel as previously presented (12.5% nickel in Deposit);
Set B: Standard with 250 ppm of $Fe^{2+}$ complexed with gluconate (≈1% iron in deposit);
Set C Standard with 500 ppm of $Fe^{2+}$ complexed with gluconate (≈2% iron in deposit);
Set D: Standard with 1000 ppm of $Fe^{2+}$ complexed with gluconate (≈4% iron in deposit).

All panels were passivated with a commercial, trivalent chromium clear/blue passivate prior testing.

Panels were then exposed to neutral salt spray for accelerated corrosion testing per ASTM B117.

Results were as followed:

| | Iron as wt % in deposit | Appearance | | | |
|---|---|---|---|---|---|
| Iron Conc. In bath | | @ 0 hrs NSST | @ 48 hrs NSST | @ 72 hrs NSST | @ 168 hrs NSST |
| 0 ppm $Fe^{2+}$ Panel Set A | 0% | 0% white corrosion | 100% white corrosion | ≈5% red corrosion | ≈20% red corrosion |
| 250 ppm $Fe^{2+}$ Panel Set B | 1.50% | 0% white corrosion | ≈90% white corrosion | ≈5% red corrosion | ≈20% red corrosion |
| 500 ppm $Fe^{2+}$ Panel Set C | 2.00% | 0% white corrosion | ≈70% white corrosion | ≈90% white corrosion | ≈5% red corrosion |
| 1000 ppm $Fe^{2+}$ Panel Set D | 4.00% | 0% white corrosion | ≈10% white corrosion | ≈10% white corrosion | ≈10% white corrosion |

This testing shows a modest improvement in the corrosion properties with 250 ppm of iron in solution (~1.5% Fe in the alloy) and as the iron content goes up, so too the corrosion resistance. Incorporation of 4% Fe into the as deposited Zn—Ni—Fe alloy, resulted in no red corrosion being encountered during the testing, indicating complete protection of the substrate. This is more than double the corrosion resistance of just a Zn—Ni deposit.

In another example, bolt heads were plated with a zinc-nickel-iron alloy plating system in accordance with one embodiment and a comparative zinc-nickel alloy plating system. The zinc-nickel-iron alloy plating system employed an alkaline zinc-nickel-iron plating bathing having the following formulation and plating conditions:

8 g/L zinc;
1100 ppm nickel;
131 g/L caustic.
4% Iron/gluconate additive (1000 ppm ferrous iron)
Barrel plate 10 ASF for 30 minutes.
Bolt heads have 6 microns thickness zinc-nickel-iron with approximately 13% nickel and 4% iron in the deposit The comparative zinc-nickel alloy plating system employed an alkaline zinc-nickel plating bathing having the following formulation and plating conditions:

8 g/L zinc;
1100 ppm nickel;
131 g/L caustic.
Barrel plate 10 ASF for 30 minutes.
Bolt heads have 6 microns thickness zinc-nickel with approximately 13% nickel in the deposit.

The bolt heads were subjected to accelerated corrosion testing per ASTM B117 corrosion resistance for 72 hours. FIGS. 4(A-B) show the improvement of the alloy when compared to standard Zn—Ni, deposited on steel, without any passivate. Or, more simply, the alloy alone in direct comparison to Zn—Ni. The lesser preponderance of red rust location on the ternary alloy indicates superior corrosion resistance.

From the above description of the invention, those skilled in the art will perceive improvements, changes and modifications Such improvements, changes and modifications are within the skill of the art and are intended to be covered by the appended claims. All publications, patents, and patent applications cited in the present application are herein incorporated by reference in their entirety.

Having described the invention the following is claimed:

1. An aqueous alkaline zinc-nickel-iron electroplating bath for depositing a ternary zinc-nickel-iron alloy on a substrate, the aqueous alkaline zinc-nickel-iron electroplating bath comprising:
    zinc ions,
    nickel ions,
    an alkaline compound selected from the group consisting of sodium hydroxide and potassium hydroxide, and
    a complex consisting of an iron salt and an iron complexing agent, wherein the iron complexing agent is selected from the group consisting of sodium gluconate, sodium tartrate, sodium hydroxybutyrate, potassium gluconate, potassium tartrate, and/or potassium hydroxybutyrate, and wherein the complex is formed prior to addition to the electroplating bath,
    wherein a concentration of iron ions in the electroplating bath provided by the complex is from about 0.1 gram per liter to about 25 grams per liter,
    wherein the electroplating bath is maintained at a pH of more than about 13 wherein the electroplating bath is configured to deposit a ternary zinc-nickel-iron alloy containing 7 to 16 wt. % nickel, 0.5 to 8.0 wt. % iron, and the balance zinc, and wherein the electroplating bath is at least essentially free of iron hydroxide.

2. The aqueous alkaline zinc-nickel-iron electroplating bath of claim 1, further comprising an amount of a nickel complexing agent effective to keep the nickel ions soluble in the bath.

3. The aqueous alkaline zinc-nickel-iron electroplating bath of claim 2, wherein the nickel complexing agent comprises at least one of an aliphatic amine, alkyleneimine, poly(alkyleneimine), polyamine, amino alcohol, carboxylic acids, or sodium or potassium salts thereof.

4. The aqueous alkaline zinc-nickel-iron electroplating bath of claim 1, being free of a polyoxyalkylene compound and a quaternary polymer.

5. The aqueous alkaline zinc-nickel-iron electroplating bath of claim 1, further comprising a brightener.

6. The aqueous alkaline zinc-nickel-iron electroplating bath of claim 5, wherein the brightener comprises at least one of N-methylpyridinium-3-carboxylate or salt thereof (trigonelline), 1-benzylnicotinate, or sulfopropylpyridinium.

7. The aqueous alkaline zinc-nickel-iron electroplating bath of claim 1, wherein the iron salt comprises ferrous sulfate.

8. An aqueous alkaline zinc-nickel-iron electroplating bath for depositing a ternary zinc-nickel-iron alloy on a substrate, comprising:
   about 4 grams per liter to about 50 grams per liter of zinc;
   about 0.1 grams per liter to about 10 grams per liter of nickel;
   about 50 grams per liter to about 220 grams per liter of an alkaline compound selected from the group consisting of sodium hydroxide and potassium hydroxide; and
   about 2 grams per liter to about 200 grams per liter of a nickel complexing agent; and
   a complex consisting of an iron salt and an iron complexing agent, wherein the iron complexing agent is selected from the group consisting of sodium gluconate, sodium tartrate, sodium hydroxybutyrate, potassium gluconate, potassium tartrate, and/or potassium hydroxybutyrate, wherein the complex is formed prior to addition to the electroplating bath,
   wherein a concentration of iron ions in the electroplating bath provided by the complex is from about 0.1 gram per liter to about 10 grams per liter,
   wherein the electroplating bath is configured to deposit a ternary zinc-nickel-iron alloy containing 7 to 16 wt. % nickel, 0.5 to 8.0 wt. % iron, and the balance zinc,
   wherein the electroplating bath is maintained at a pH of more than about 13, and
   wherein the electroplating bath is at least essentially free of iron hydroxide.

9. The aqueous alkaline zinc-nickel-iron electroplating bath of claim 8, wherein the nickel complexing agent comprises at least one of an aliphatic amine, alkyleneimine, poly(alkyleneimine), polyamine, amino alcohol, carboxylic acids, or sodium or potassium salts thereof.

10. The aqueous alkaline zinc-nickel-iron electroplating bath of claim 8, being free of a polyoxyalkylene compound and a quaternary polymer.

11. The aqueous alkaline zinc-nickel-iron electroplating bath of claim 8, further comprising a brightener.

12. The aqueous alkaline zinc-nickel-iron electroplating bath of claim 11, wherein the brightener comprises at least one of N-methylpyridinium-3-carboxylate or salt thereof (trigonelline), 1-benzylnicotinate, or sulfopropylpyridinium.

13. The aqueous alkaline zinc-nickel-iron electroplating bath of claim 8, wherein the iron salt comprises ferrous sulfate.

* * * * *